United States Patent [19]

Liu et al.

[11] Patent Number: 5,031,089
[45] Date of Patent: Jul. 9, 1991

[54] DYNAMIC RESOURCE ALLOCATION SCHEME FOR DISTRIBUTED HETEROGENEOUS COMPUTER SYSTEMS

[75] Inventors: Howard T. Liu, San Marino; John A. Silvester, Los Angeles, both of Calif.

[73] Assignee: United States of America as represented by the Administrator, National Aeronautics and Space Administration, Washington, D.C.

[21] Appl. No.: 292,124

[22] Filed: Dec. 30, 1988

[51] Int. Cl.⁵ .............................................. G06F 12/00
[52] U.S. Cl. .................................. 364/200; 364/281.3; 364/281; 364/281.6; 364/281.8
[58] Field of Search ... 364/200 MS File, 900 MS File, 364/281.3, 281, 281.6, 281.8, 975.5

[56] References Cited

U.S. PATENT DOCUMENTS

| | | | |
|---|---|---|---|
| 4,099,235 | 7/1978 | Hoschler et al. | 364/200 |
| 4,403,286 | 9/1983 | Fry et al. | 364/200 |
| 4,413,318 | 11/1983 | Herrington | 364/200 |
| 4,495,570 | 1/1985 | Kitajima et al. | 364/200 |
| 4,577,272 | 3/1986 | Ballew et al. | 364/200 |
| 4,839,798 | 6/1989 | Eguchi et al. | 364/200 |
| 4,852,001 | 7/1989 | Tsushima et al. | 364/401 |

*Primary Examiner*—Joseph A. Popek
*Assistant Examiner*—Rebecca L. Rudolph
*Attorney, Agent, or Firm*—Thomas H. Jones; Harold W. Adams; John R. Manning

[57] ABSTRACT

In a distributed heterogeneous computer system having a plurality of computer nodes each operatively connected through a network interface to a network to provide for communications and transfers of data between the nodes and wherein the nodes each have a queue for containing jobs to be performed, an improvement for dynamically reallocating the system's resources for optimized job performance. There is first logic at each node for dynamically and periodically calculating and saving a workload value as a function of the number of jobs on the node's queue. Second logic is provided at each node for transfering the node's workload value to other nodes on the network at the request of the other nodes. Finally, there is third logic at each node operable at the completion of each job. The third logic includes, logic for checking the node's own workload value, logic for polling all the other nodes for their workload value if the checking node's workload value is below a preestablished value indicating the node as being underutilized and available to do more jobs, logic for checking the workload values of the other nodes as received, and logic for transfering a job from the queue of the other of the nodes having the highest workload value over a preestablished value indicating the other of the nodes as being overburdened and requiring job relief to the que of the checking node. The third logic is also operable periodically when the node is idle.

16 Claims, 3 Drawing Sheets

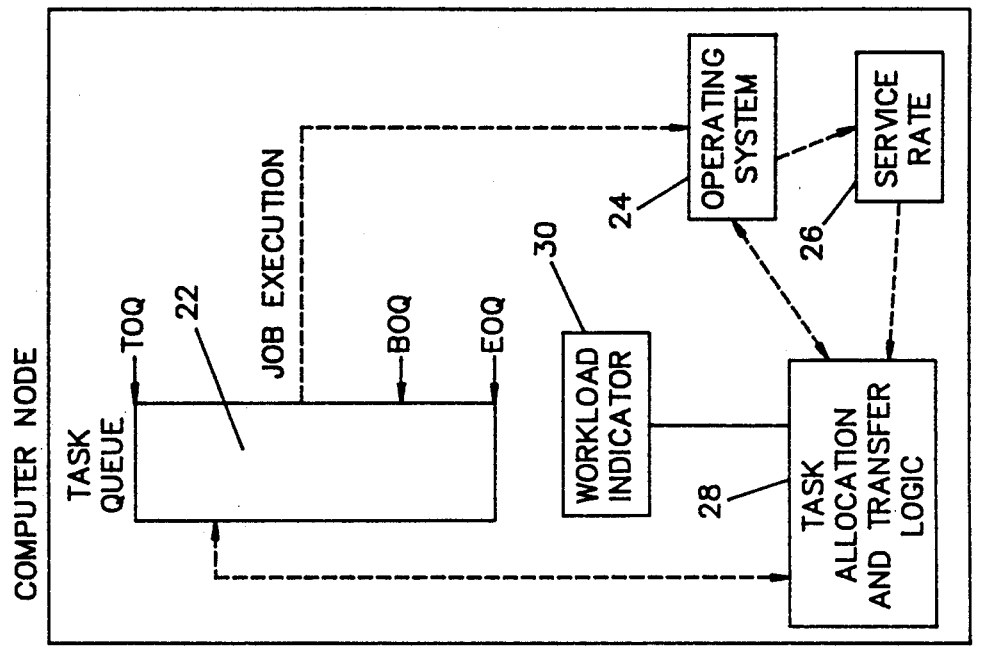
FIG. 3
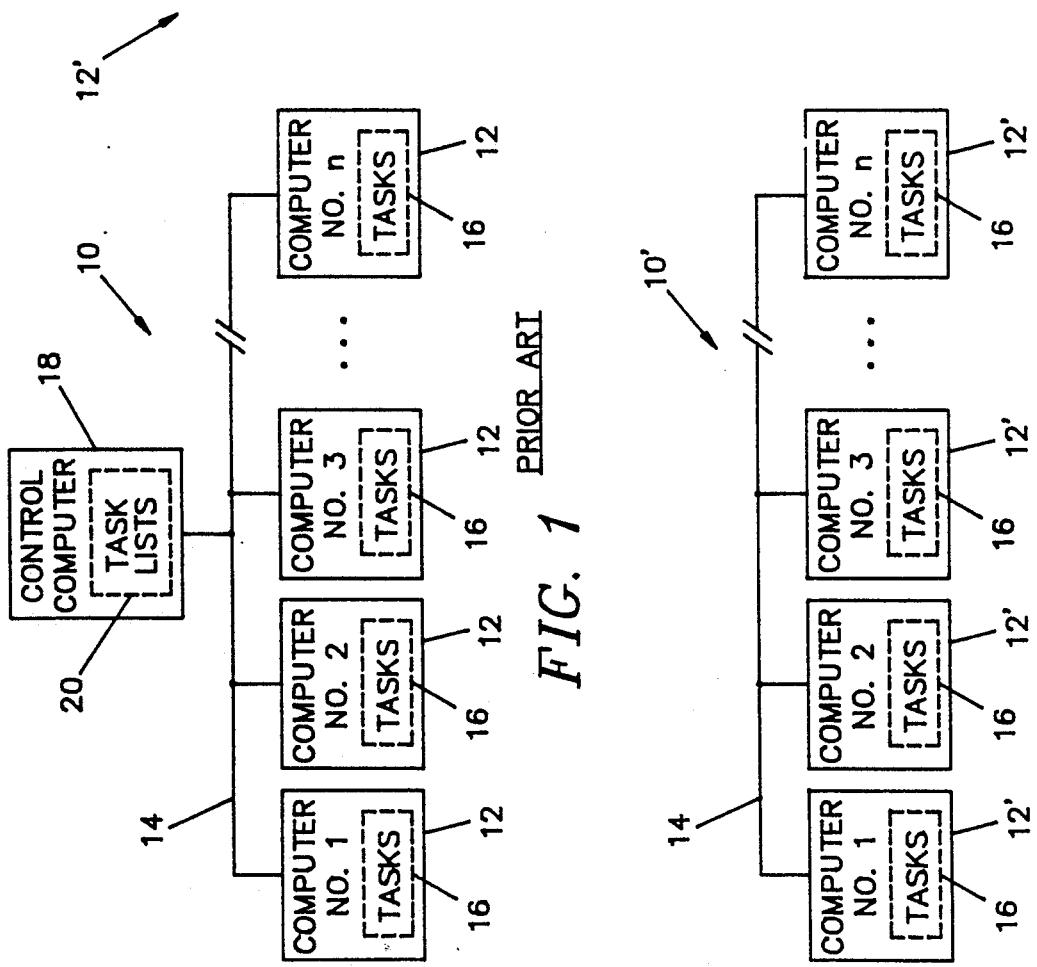
FIG. 1 PRIOR ART
FIG. 2

DYNAMIC RESOURCE ALLOCATION SCHEME FOR DISTRIBUTED HETEROGENEOUS COMPUTER SYSTEMS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to resource allocation in computer systems and, more particularly, to a method and associated apparatus for shortening response time and improving efficiency of a heterogeneous distributed networked computer system by reallocating the jobs queued up for busy nodes to idle, or less-busy nodes. In accordance with a novel algorithm, the load-sharing is initiated by the server device in a manner such that extra overhead is not imposed on the system during heavily-loaded conditions.

BACKGROUND ART

In distributed networked computer systems there is a high probability that one of the workstations will be idle while others are overloaded. Thus, the response times for certain tasks are longer than they should be if all the capabilities in the system could be shared fully. As is known in the art, the solution is to reallocate tasks from queues connected to busy computers to idle computer queues.

As depicted in FIG. 1, a distributed computer system 10 consists of several computers 12 with the same or different processing capabilities, connected together by a network 14. Each of the computers 12 has tasks 16 assigned to it for execution. In such a distributed multi-computer system, the probability is high that one of the computers 12 is idle while another computer 12 has more than one task 16 waiting in the queue for service. This probability is called the "imbalance probability". A high imbalance probability typically implies poor system performance. By reallocating queued tasks or jobs to the idle or lightly-loaded computers 12, a reduction in system response time can be expected. This technique is called "load sharing" and is one of the main foci of this invention. As also depicted in FIG. 1, such redistribution of the tasks 16 on a dynamic basis is known in the art. Typically, there is a control computer 18 attached to the network 14 containing task lists 20. On various bases, the control computer 18 dynamically reassigns tasks 16 from the lists 20 to various computers 12 within the system 10. For example, it is known in the art to have each of the computers 12 provide the control computer 18 with a indicator of the amount of computing time on tasks that is actually taking place. The control computer 18, with knowledge of the amount of use of each computer 12 available, is then able to reallocate the tasks 16 as necessary. In military computer systems, and the like, this ability to reconfigure, redistribute, and keep the system running is an important part of what is often referred to as "graceful degradation"; that is, the system 10 continues to operate as best it can to do the tasks at hand on a priority basis for as long as it can.

The inventors herein did a considerable amount of statistical analysis and evaluation of networked computer systems according to the known prior techniques for load distribution and redistribution. Their finding will now be set forth by way of example to provide a clear picture of the background and basis for the present invention.

The imbalance probability, IP, for a heterogeneous system can be calculated by mathematical techniques well known to those skilled in the art which, per se, are no part of the novelty of the present invention. There is a finite, calculatable probability that I out of N computers comprising a networked system are idle. There is also a finite probability that all stations other than those I stations are busy, as well as a probability that there is exactly one job in each one of the remaining (N-I) stations, i.e. a finite probability that at least one out of (N-I) stations has one or more jobs waiting for service. By summing over the number of idle stations, from I to N, the imbalance probability for the whole system can be obtained. By way of example, in a homogeneous system, all the nodes (i.e. computers 12) have the same service rate and the same arrival rate. As the number of nodes increases, the peak of the imbalance probability goes higher. As the number of nodes increases to twenty, the imbalance probability approaches I when the traffic intensity (arrival rate divided by the service rate at each node) ranges from 40% to 80%. The statistical curves also indicate that the probability of imbalance is high during moderate traffic intensity. This occurs due to the fact that all nodes are either idle (i.e. there is low traffic intensity) or are busy (i.e. there is high traffic intensity).

If the arrival rate is not evenly distributed, the imbalance probability becomes even higher. In the imbalance probability of a two-node heterogeneous system, the faster node is twice as fast as the slower one and the work is evenly distributed. If the work is not balanced, it has been observed that the imbalance probability goes even higher during high traffic intensity at the slower node. At this point, the slower node is heavily loaded even though the faster node is only 50% utilized.

Numerous studies have addressed the problem of resource-sharing in distributed systems. It is convenient to classify these strategies as being either static or dynamic in nature and as having either a centralized or decentralized decision-making capability. One can further distinguish the algorithms by the type of node that takes the initiative in the resource-sharing. Algorithms can either be sender-initiated or server-initiated. Some algorithms can be adapted to a generalized heterogeneous system while others can only be used in a homogeneous system. These categories are further explained as follows:

Static/Dynamic: Static schemes use only the information about the long-term average behavior of the system, i.e. they ignore the current state. Dynamic schemes differ from static schemes by determining how and when to transfer jobs based on the time-dependent current system state instead of the average behavior of the system. The major drawback of static algorithms is that they do not respond to fluctuations of the workload. Dynamic schemes attempt to correct this drawback but are more difficult to implement and may introduce additional overhead. In addition, dynamic schemes are hard to analyze.

Centralized/Decentralized: In a system with centralized control, jobs are assumed to arrive at the central controller which is responsible for distributing the jobs among the network's nodes; in a decentralized system, jobs are submitted to the individual nodes and the decision to transfer a job to another node is made locally. This central dispatcher approach is quite restrictive for a distributed system.

Homogeneous/Heterogeneous system: In the homogeneous system, all the computer nodes are identical and have the same service rate. In the heterogeneous system, the computer nodes do not have the same processing power.

Sender/Server Initiated: If the source node makes a determination as to where to route a job, this is defined as a sender-initiated strategy. In server-initiated strategies, the situation is reversed, i.e., lightly-loaded nodes search for congested nodes from which work may be transferred.

The prior art as discussed in the literature (see Listing of Cited References hereinafter) will now be addressed with particularity.

First, there are the static strategies. Stone [Ston 78] developed a centralized maximum flow algorithm for two processors (i.e. computer nodes) by holding the load of one processor fixed and varying the load on the other processor. Ni and Hwang [Hwan 81] studied the problem of load balancing in a multiple heterogeneous processor system with many job classes. In this system, the number of processors was extended to more than two. Tantawi and Towsley [Tant 85] formulated the static resource-sharing problem as a nonlinear programming problem and presented two efficient algorithms, the parametric-study algorithm and the load-balancing problem. Silva and Gerla [Silv 84] used a downhill queueing procedure to search for the static optimal job assignment in a heterogeneous system that supports multiple job classes and site constrains. Recently, Kurose and Singh [Kuro 86] used an iterative algorithm to deal with the static decentralized load-sharing problem. Their algorithm was examined by theoretical and simulation techniques.

Next, there are the dynamic strategies. Chow and Kohler [Chow 79] used a queueing theory approach to examine a resource-sharing algorithm for a heterogeneous two-processor system with a central dispatcher. Their objective was to minimize the mean response time. Foschni and Salz [Fosc 79] generalized one of the methods developed by Chow and Kouler to include multiple job dispatchers. Wah [Wah 84] studied the communication overhead of a centralized resource-sharing scheme designed for a homogeneous system. Load-balancing of the Purdue ECN (Engineering Computer Network) was implemented with a dynamic decentralized RXE (remote execution environment) program [Hawn 82]. With the decentralized RXE, the load information of all the processors was maintained in each network machine's kernel. One of the problems with this approach is the potentially high cost of obtaining the required state information. It is also possible for an idle processor to acquire jobs from several processors and thus become overloaded. Ni and Xu [Ni 85] propose the "draft" algorithm for a homogeneous system. Wah and Juang [Wah 85] propose a window control algorithm to schedule the resource in local computer systems with a multi-access network. Wang and Morris [Wang 85] studied ten different algorithms for homogeneous systems to evaluate the performance differences. Eager, et al. [Eage 86] addressed the problem of decentralized load sharing in a multiple system using dynamic-state information. Eager discussed the appropriate level of complexity for load-sharing policies and showed that schemes that use relatively simple state information do very well and perform quite closely to the optimal expected performance. The system configuration studied by Eager, et al. was also a homogeneous system. Towsley and Lee [Tows 86] used the threshold of the local job queue length at each host to make decisions for remote processing. This computer system was generalized to be a heterogeneous system.

In summary, most of the work reported in the literature has been limited to either static schemes, centralized control, homogeneous systems, or to two-processor systems where overhead considerations were ignored. All of these approaches make assumptions that are too restricted to apply to most real computer system installations. The main contribution of this reported work is the development of a dynamic, decentralized, resource-sharing algorithm for a heterogeneous multiple (i.e. greater than two) processor system. Because it is server-initiated, this approach thus differs significantly from the sender-initiated approach described in [Tows 86]. The disadvantage of this prior art server-initiated approach is that it imposes extra overhead in the heavily-loaded situation and therefore, it could bring the system to an unstable state.

LIST OF CITED REFERENCES

[Wah 85] Baumgartner, K. M. and Wah, B. W. "The Effects of Load Balancing on Response Time for Local Computer Systems with a Multiaccess Network," IEEE International Comm. Conf. 1985, pp. 10.1.1–10.1.5.

[Chow 79] Chow, Y. C. and Kohler, W. H. "Models for Dynamic Load Balancing in a Heterogeneous Multiple Processor System," IEEE Trans. Computers, Vol. C-28, No. 5, pp. 345–361, May 1979.

[Eage 86] Eager, D. L., Lazowska, E. D., and Zahorjan, J. "Adaptive Load Sharing in Homogeneous Distributed Systems," IEEE Trans. on Software Eng., Vol. SE-12, No. 5, May 1986.

[Eage 85] Eager, D. L., Lazowska, E. D., and Zahorjan, J. "A Comparison of Receiver-Initiative and Sender-Initiative Dynamic Load Sharing," Tech Report No. 85-04-01, Dept. of Computer Science, University of Washington, April 1985.

[Fisc 78] Foschini, G. J. and Salz, J. "A Basic Dynamic Routing Problem with Diffusion," IEEE Trans. Commun., Vol. Com-26, pp. 320–327, March 1978.

[Huan 82] Hwang, K. and Wah, B. "A UNIX-Based Local Computer Network with Load Balancing," IEEE Computer, April 1982.

[Hwan 81] Hwang, K. and Ni, L. M. "Optimal Load Balancing Strategies for a Multiple Process System," Proc. of Intel. Conf. on Parallel Processing, August 1981.

[Hwan 82] Hwang, K. and Croft, W. J., et al. "A UNIX-Based Local Computer Network with Load Balancing," IEEE Computer magazine, April 1982.

[Kari 85] Karian, Z. A. "GPSS/PC: Discrete-Event Simulation on the IBM PC," Byte, October 1985.

[Klei 75] Kleirock, L. "Queueing System", Vol I: Theory John Wiley & Sons, 1975.

[Kuro 86] Kurose, J. and Singh, S. "A Distributed Algorithm for Optimal Static Load Balancing in Distributed Computer Systems," IEEE Infocom, April 1986.

[Ni 81] Ni, L. M. and Hwang, K. "Optimal Load Balancing Strategies for a Multiple Processor System,"

Proc. Tenth Int'l Conf. Parallel Processing, pp. 352-257, August 1981.

[Ni 85] Ni, L. M. "A Distributed Drafting Algorithm for Load Balancing," IEEE Trans. on Software Eng., Vol. SE-11, No. 10, October 1985.

[Silv 84] Silva, E. S. and Gerla, M. "Load Balancing in Distributed Systems with Multiple Classes and Site Constraints", Performance 84 (North Holland), pp. 17-33, 1984.

[Ston 78] Stone, H. S. "Critical Load Factors in Two-Processor Distributed Systems," IEEE, Trans. of Software Engineering, Vol. SE-4, No. 3, pp. 254-258, May 1978.

[Tows 86] Towsley, D. and Lee, K. J. "A Comparison of Priority-Based Decentralized Load Balancing Policies," ACM Performance Evaluation Review, Vol. 14, No. 1, pp. 70-77, May 1986.

[Tows] Towsley, D. and Lee, K. J. "On the Analysis of a Decentralized Load Sharing Policy in Heterogeneous Distributed Systems," Submitted to IEEE, Trans. of Computer.

[Tant 85] Tantawi, A. N. and Towsley, D. "Optimal Static Load Balancing in Distributed Computer," JACM, Vol. 32, No. 2, pp. 445-465, April 1985.

[Triv 82] Trivedi, S. "Probability and Statistics with Reliability, Queueing and Computer Science Applications," Prentice-Hall, Inc., 1982.

[Wah 85] Wah, B. and Lien,, Y. N. "Design of Distributed Database on Local Computer Systems with a Multi-Access Network", IEEE Trans. Software Engineering. Vol. SE-11, No. 7, July 1985.

[Wah 85] Wah, B. and Yuang, J. Y. "Resource Scheduling for Local Computer Systems with a Multi-Access Network," IEEE Trans. on Computers, Vol. C-34, No. 12, December 1985.

[Wang 85] Wang, Y. T. and Morris, R. J. T. "Load Sharing in Distributed Systems," IEEE Trans. on Computers, Vol. C-34, pp. 204-217, March 1985.

The foregoing articles and reports from the literature are only generally relevant for background discussion purposes and, since copies are not readily available to applicants for filing herewith, they are not being provided. In addition to the foregoing non-supplied articles from the literature, however, copies of the following relevant U.S. Letters Patent are being provided herewith:

[1] Hoschler, H., Raimar, W., and Bandmaler, K. "Method of Operating a Data Processing System," U.S. Pat. No. 4,099,235, July 4, 1978.

[2] Kitajima, H. and Ohmachi, K. "Processing Request Allocator for Assignment of Loads in a Distributed Processing System," U.S. Pat. No. 4,495,570, Jan. 22, 1985.

[3] Fry, S. M., Hempy, H. O., and Kittinger, B. E. "Balancing Data-Processing Workloads", U.S. Pat. No. 4,403,286, Sept. 6, 1983.

With respect to the above-listed U.S. Patents and the teaching thereof vis-a-vis the present invention to be described hereinafter, the inventors herein have invented a new dynamic load-balancing scheme for a distributed computer system consisting of a number of heterogeneous hosts connected by a local area network (LAN). As mentioned above, numerous studies have addressed the problem of resource-sharing in distributed systems. For purposes of discussion and distinguishing, it is convenient to classify these strategies as being either static or dynamic in nature and as having either a centralized or decentralized decision-making capability. One can further distinguish the algorithms employed by the type of node that takes the initiative in the resource-sharing. Algorithms can be either sender-initiated or receiver-initiated. Some algorithms can be adapted to a generalized heterogeneous system while others can be used only in a homogeneous system. These categories are further addressed with respect to the above-referenced prior art patents as follows.

Centralized/Decentralized: In a system with centralized control (as shown in FIG. 1) jobs arrive at the central control computer 18 which is responsible for distributing the jobs among the network nodes. In a decentralized system, jobs are submitted to the individual nodes and the decision to transfer a job to another node is made locally. The central dispatcher approach is quite restrictive for a distributed system. In the teachings of their patent, Kitajima, H. and Ohmachi assign a processing request allocator to be the single controller of their centralized scheme. One of the problems with this approach is the potentially high cost of obtaining the required state information. It is also possible for an idle processor to acquire jobs from several processors and thus become overloaded.

Homogeneous/Heterogeneous system: In a homogeneous system, all computer nodes must be identical and have the same service rate. In the heterogeneous system, the computer nodes do not have the same processing power. In their patent, Fry, S. M., Hempy, H. O., and Kittinger, B. E. disclose a scheme to balance data-processing workloads on a homogeneous environment.

Sender/Receiver Initiated: If the source node makes a determination as to where to route a job, this is defined as a sender-initiated strategy. In receiver-initiated strategies, the situation is reversed, i.e., lightly-loaded nodes search for congested nodes from which work may be transferred. In their patent, Hoschler, H., Raimar, W., and Brandmaler disclose a sender-initiated scheme. The inventors herein have proved that the receiver-initiated approach is superior at medium to high loads and, therefore, have incorporated such an approach in their invention in a novel manner.

Static/Dynamic: Static schemes use only the information about the long-term average behavior of the system, i.e. they ignore the current state. Dynamic schemes differ from the static schemes by determining how and when to transfer jobs based on the time-dependent current system state instead of the average behavior. The major drawback of static algorithms is that they do not respond to fluctuations of the workload. Dynamic schemes attempt to correct this drawback.

STATEMENT OF THE INVENTION

Accordingly, an object of the invention is the providing of a dynamic decentralized resource-sharing algorithm for a heterogeneous multi-processor system.

It is another object of the invention to provide a dynamic decentralized resource-sharing algorithm for a heterogeneous multi-processor system which is receiver-initiated in heavy load so that it does not impose extra overhead in the heavily-loaded situation and, therefore, will not bring the system to an unstable state.

Another object of the present invention is to prevent an idle node in a heterogeneous multi-processor system from becoming isolated from the resource-sharing process, as can happen with the systems of Fry and Kitajima by providing a wakeup timer used at each idle node to periodically cause the idle node to search for a job that can be transferred from a heavily-loaded node.

Still another object of the present invention is to use the local queue length and the local service rate ratio at each node as a more efficient workload indicator.

It is yet a further object of the invention to provide a dynamic decentralized resource-sharing algorithm for a heterogeneous multi-processor system which dynamically adjusts to the traffic load and does not generate extra overhead during high traffic loading conditions and, therefore, cannot bring the system to an unstable state.

The foregoing objects have been achieved in a distributed heterogeneous computer system having a plurality of computer nodes each operatively connected through a network interface to a network to provide for communications and transfers of data between the nodes and wherein the nodes each have a queue for containing jobs to be performed, by the improvement of the present invention for dynamically reallocating the system's resources for optimized job performance. There is first logic at each node for dynamically and periodically calculating and saving a workload value as a function of the number of jobs on the node's queue. Second logic is provided at each node for transfering the node's workload value to other nodes on the network at the request of the other nodes. Finally, there is third logic at each node operable at the completion of each job. The third logic includes, logic for checking the node's own workload value, logic for polling all the other nodes for their workload value if the checking node's workload value is below a pre-established value indicating the node as being underutilized and available to do more jobs, logic for checking the workload values of the other nodes as received, and logic for transfering a job from the queue of the other of the nodes having the highest workload value over a pre-established value indicating the other of the nodes as being overburdened and requiring job relief to the queue of the checking node. The third logic is also operable periodically when the node is idle.

Other objects and advantages of the present invention will become apparent from the description which follows hereinafter when taken in conjunction with the drawing figures which accompany it.

BRIEF DESCRIPTION OF THE DRAWINGS

FIG. 1 is a simplified block diagram of a prior art distributed computer system employing a control computer to distribute and redistribute the tasks among the computer nodes on the network.

FIG. 2 is a simplified block diagram of a distributed computer system according to the present invention.

FIG. 3 is a functional block diagram of a computer from the system of FIG. 2 pointing out the portions thereof related to the present invention.

DETAILED DESCRIPTION OF THE INVENTION

Figure 4:
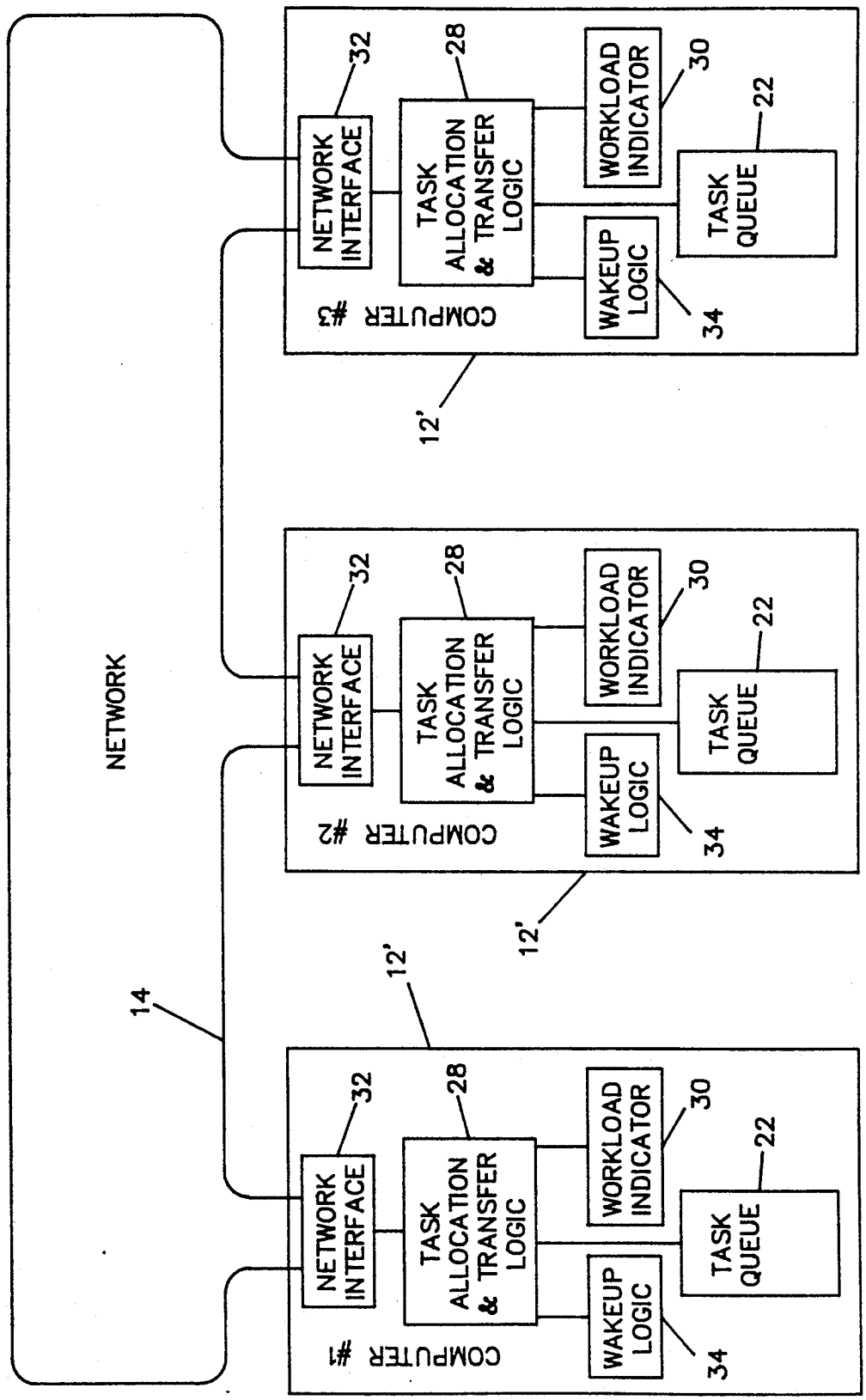
FIG. 4 is a functional block diagram of the system of FIG. 2 showing the is which tasks are dynamically reallocated accord dual mode approach of the present invention.

The new and novel resource-sharing algorithm of the present invention, which the inventors call the Server-Initiated Dynamic Resource-Sharing Algorithm (SIDA for short), will now be presented. A queueing analysis of the algorithm's performance is presented and the result is validated by the reporting of simulation results. The basic environment is as depicted in FIG. 2; that is, there are a plurality of computer nodes 12' distributed across a network 14 without the need for a control computer 18 as in the prior art of FIG. 1.

As observed earlier herein, most of the work of the prior art has been limited to either static schemes, centralized control, or homogeneous systems. All of these approaches make assumptions that are much too restrictive to apply to most real computer system installations. The main contribution of the present invention is the providing of a dynamic, decentralized, resource-sharing algorithm for a heterogeneous, multi-processor, computer system (such as that generally indicated as 10' in FIG. 2). The algorithm employed in the present invention uses a dual-mode, server-initiated approach which is clearly novel over anything taught or suggested by the prior art. Jobs are transferred from heavily burdened nodes (i.e. over a high threshold limit) to low burdened (or idle) nodes at the initiation of the receiving node when (1) a job finishes at a node which is burdened below a pre-established threshold level or (2) a node has been idle for a period of time as established by a wakeup timer at the node. The important advantage of this approach is that, unlike the prior art approaches, it does not impose extra overhead in the heavily-loaded situation. Therefore, it cannot bring the system to an unstable state. The algorithm also has two important advantages over the prior art. First, to prevent an idle node from becoming isolated from the resource-sharing process, the wakeup timer is included. As will be addressed in greater detail shortly, the wakeup timer is used at each idle node to periodically cause the idle node to search for a job that can be transferred from a heavily-loaded node. Second, this invention uses a combination of the local queue length and the local service rate ratio at each node as the workload indicator. In a heterogeneous computer system, it is more efficient to use this workload indicator rather than just the local queue length as employed in the prior art.

It was determined by the inventors herein that an ideal resource-sharing algorithm should have the following characteristics:

1) Dynamic: the load distribution should adapt to rapid system load changes.

2) Decentralized: each processing computer node should determine, on its own, whether to process a job locally or to send the job to some other node for processing. There is no need for a central dispatcher. Since the central dispatcher is not required, the problem of a potential single point of failure is eliminated.

3) Server-initiated: a good scheme should only request job relocation when there are idle processors available to serve the relocated jobs. By using the server-initiated approach, the danger of sender-initiated schemes, i.e. that all the nodes are overloaded and each attempts to give away jobs causing unproductive overhead which simply further saturates the already overloaded system, is eliminated.

The following is an outline of the basic SIDA algorithm in a computer language type of form:
GIVEN---
N = Number of total nodes in the heterogeneous system;
H = Service rate of node i;
Q = Queue length at node i.
WHILE---

{[(a job completes at node i) or wakeup-timeout] and
[Q/H≦LOW-THRESHOLD]}
DO
probe Q for k-1 to N, k=i;
identify the node, j, with the MAX(Q );
if Q /H≧HIGH-THRESHOLD then
DO
transfer 1 job from node j to node i;
(*job is processed at node i and the results are returned to node j*)
END
END.

Figure 5:
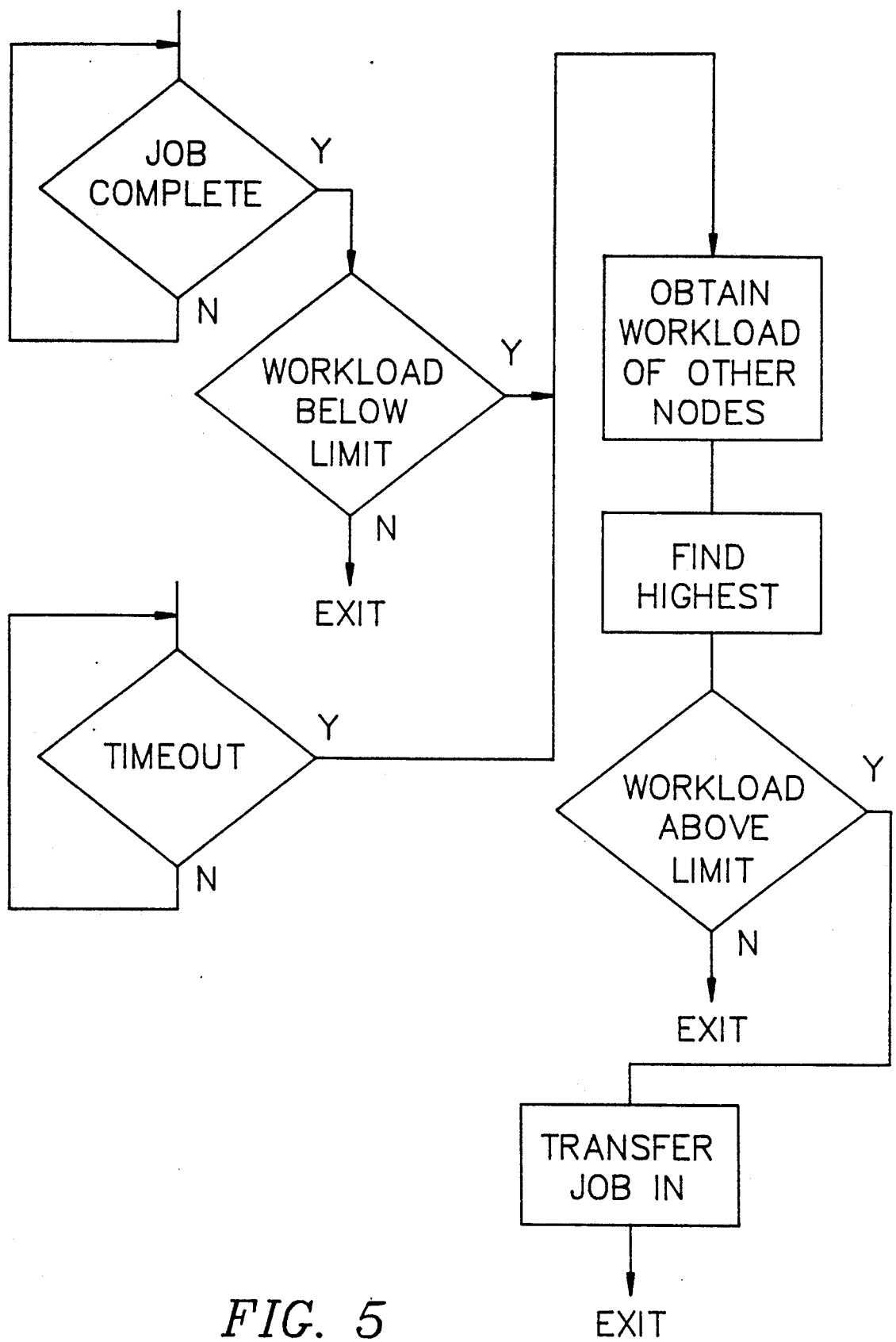
FIG. 5 is a flowchart of the logic of the method of the present invention.

The environment of the present invention is shown in greater detail in FIGS. 3 and 4 while the dual mode algorithm logic is shown in flowchart form in FIG. 5. Each computer node 12' includes a task queue 22. Pointers are provided to the top of queue (TOQ), end of queue (EOQ), and bottom of queue (BOQ). The length of the active contents of the queue 22 at any time can be determined by subtracting TOQ from BOQ. The percentage of the active contents of the queue 22 at any time is, of course, easily calculated as BOQ−TOQ/EOQ−TOQ. As depicted in FIG. 3, the operating system 24, for example, can provide a service rate 26 for the node 12', i.e. the ratio (percentage) of computational usage of the node 12' compared with its potential. The SIDA as incorporated into the block labelled TASK ALLOCATION AND TRANSFER LOGIC 28, uses the length of the local queue 22 and the local service rate 26 at each node 12' as the workload indicator 30 for that node 12'. When a job finishes at a node 12', the logic 28 of the node 12' checks the workload indicator 30 obtained by dividing the queue length by the service rate. If the workload indicator 30 is less than a certain low threshold level, the lightly-loaded node 12' initiates a search for the most busy node 12'.

As depicted in FIG. 4, in the system 10' of the present invention, the task allocation and transfer logic 28 of each node 12' is connected to the network 14 through a network interface 32. Thus, as configured, the task allocation and transfer logic 28 of each node 12' can access the last calculated workload indicator 30 of all the other nodes 12' on the network 14. To accomplish a search for the most busy node 12', the task allocation and transfer logic 28 of a node 12' simply requests the workload indicators 30 of all the other nodes 12' on the network 14. If the workload indicator 30 of the most busy node 12' is above a certain high threshold, a job from the task queue 22 of that busy node 12' is transferred to the lightly-loaded node 12'. To prevent an idle node 12' from becoming isolated from the resource-sharing process, the wakeup timer 34 is used at each idle node 12' to periodically cause the idle node 12' to search for a job which can be transferred from a heavily loaded node 12'. Thus, SIDA provides a method which balances the workload among the nodes 12', resulting in a beneficial and substantial improvement in the response time and throughput performance of the total system. It should be noted that SIDA adjusts dynamically to the traffic load of each node 12'. When the workload indicator of every node 12' is greater than a certain threshold level, the algorithm generates no overhead—an important and novel advantage over the prior art.

In the prior art, such as reported in Wah's research [Wah 85], the priority level of the load-balancing process is assumed to be lower than that of regular jobs, thereby preventing the resource-sharing procedure from inhibiting normal operation. In direct contrast to this prior art assumption and teaching, however, for SIDA it is necessary and preferred to assign the highest priority level to the resource-sharing process. This is because, otherwise, the lightly-loaded nodes 12' could not receive the workload indicators 30 from the other nodes 12' upon which to base a decision and jobs would never be transferred from the heavy-loaded nodes 12' in a timely manner, i.e. before the heavily-loaded nodes 12' become lightly-loaded.

VALIDITY TESTING RESULTS

The present invention and its novel algorithm were verified by simulation modeling. A multiple processor heterogeneous system was considered in which the service rates of the nodes are not necessarily identical. Each node was modeled as a queueing center. For a particular station m, new jobs were assumed to arrive at rate $r_m$. The average service rate was $s_m$ and the inter-wakeup time, which was the same for all nodes, was $1/r_w$. The state of the system was defined to be the number of jobs in a node, either in the queue or being served. The objective of the performance analysis was to determine the effects of resource-sharing according to the method of the present invention on the average system response time. These effects are a function of the traffic intensity, which is defined as the ratio of the job arrival rate to the job service rate.

The basic assumptions made in this performance study were as follows:

a) There is only one class of tasks. The task arrival rate to each processor is exponentially distributed. The arrival rates at each processor may be different.

b) The resource service rates are exponentially distributed and may be different for each resource processor.

c) The average inter-wakeup rate $r_w$ for each idle node is the same and is exponentially distributed.

d) Each job needs only one resource.

e) The network transmission delay in propagating requests, probing the status of other nodes, and returning results is negligible. This assumption is valid if the transmission bandwidth is large compared to the traffic on the network.

f) All processing overhead for probing, packing and unpacking data, request and result transfer are ignored. This assumption is valid if the processing required to pack and unpack the job is significantly less than the processing required to process the job.

g) For simplicity, only the queue length was used as the workload indicator.

h) Lightly-loaded nodes polled jobs from any heavily-loaded node rather than selecting only the most heavily-loaded one.

i) The low threshold is assumed to be 0. In other words, a node tries to poll a job from other nodes while it is idle.

j) The high threshold is assumed to be 2.

Exact analysis of the algorithm was quite complex since one is faced with an N-dimensional Markov chain. The inventors employed a simplified approximate model which they proved to their satisfaction to be quite accurate in performance prediction. The approach characterized the iteration between the various queues in terms of their steady-state occupancy probabilities. Iteration was then used to update estimates of the interaction. To account for the load from other nodes, the inventors divided by the expected number of nodes that have more than one job. The findings were as follows.

When the last job is completed and the node is about to leave state 1, node m always probes all other nodes. There are three detailed procedures that take place during this state transition:

1) The last local job finishes.
2) Node m probes all the other nodes to check whether any other node has more than one job. Note, there is a probability that at least one of the remote nodes has one or more jobs waiting in queue for service.
3) If a remote node has more than one job, the algorithm transfers one job from the remote node to the local node and the node remains in state 1. There is a probability that node m cannot find an overloaded node and therefore node m transfers to state 0 with the service rate $s_m$.

While in an idle state, node m "wakes up" frequently at the average wakeup rate $r_w$. In all cases, after wakeup, this idle node should be able to poll a job from a remote node with the exception of the case where all other nodes are either idle or only have one job.

The inventors saw that the transition rates, and hence the steady state solution, for node m depended on the steady state probabilities of the other queues in the system. Iteration was used to produce a, hopefully, close approximate result. From the state-transition diagram, the inventors calculated the steady-state probabilities, and found that the results verified the expected performance of the algorithm embodied in the present invention.

We claim:

1. In a distributed heterogeneous computer system having a plurality of computer nodes each operatively connected through a network interface to a network to provide for communications and transfers of data between the nodes and wherein the nodes each have a queue for containing jobs to be performed, the improvement for dynamically reallocating the system's resources for optimized job performance comprising:
   a) means at each node for dynamically and periodically calculating and saving a workload value as a function of the number of jobs on the node's queue;
   b) means at each node for transfering the node's said workload value to other nodes on the network at the request of said other nodes; and,
   c) means at each node operable at the completion of each job,
      c1) for checking the node's own said workload value,
      c2) for polling all the other nodes for their said workload value if the checking node's said workload value is below a pre-established value indicating the node as being underutilized and available to do more jobs,
      c3) for checking the said workload values of the other nodes as received, and
      c4) for transfering a job from the queue of the other of the nodes having the highest said workload value over a pre-established value indicating said other of the nodes as being overburdened and requiring job relief to the queue of the checking node.

2. The improvement to a distributed heterogeneous computer system of claim 1 and additionally comprising means at each node periodically operable when the node is idle:
   a) for checking the node's own said workload value;
   b) for polling all the other nodes for their said workload value if the checking node's said workload value is below a pre-established value indicating the node as being underutilized and available to do more jobs;
   c) for checking the said workload values of the other nodes as received; and,
   d) for transfering a job from the queue of the other of the nodes having the highest said workload value over a pre-established value indicating said other of the nodes as being overburdened and requiring job relief to the queue of the checking node.

3. The improvement to a distributed heterogeneous computer system of claim 1 wherein:
   said means at each node for dynamically and periodically calculating and saving a workload value as a function of the number of jobs on the node's queue comprises means for dividing the number of jobs on the node's queue by the service rate of the node.

4. The improvement to a distributed heterogeneous computer system of claim 1 wherein:
   a) the jobs to be performed by the nodes are assigned priority levels; and,
   b) said polling of all the other nodes for their said workload value by a node is accomplished by the node as a job at the highest priority level.

5. A distributed heterogeneous computer system having dynamic resource allocation comprising:
   a) network means for providing a communications path for computer;
   b) a plurality of computer nodes each operatively connected through a network interface to said network means whereby to communicate and transfer data between said nodes, said nodes each having a queue for containing jobs to be performed;
   c) means at each said node for dynamically and periodically calculating and saving a workload value as a function of the number of jobs on said node's queue;
   d) means at each node for transferring said node's said workload value to other nodes over said network at the request of said other nodes; and,
   e) means at each node operable at the completion of each job,
      e1) for checking said node's own workload value,
      e2) for polling all the other said nodes for their said workload value if the checking node's said workload value is below a pre-established value indicating said node as being underutilized and available to do more jobs,
      e3) for checking the said workload values of the other said nodes as received, and
      e4) for transfering a job from said queue of the other of said nodes having the highest said workload value over a pre-established value indicating said other of said nodes as being overburdened and requiring job relief to said queue of the checking node.

6. The distributed heterogeneous computer system of claim 5 and additionally comprising means at each said node periodically operable when said node is idle:
   a) for checking said node's own said workload value;
   b) for polling all the other said nodes for their said workload value if the checking node's said workload value is below a pre-established value indicating said node as being underutilized and available to do more jobs;

c) for checking the said workload values of the other said nodes as received; and, d) for transfering a job from said queue of the other of said nodes having the highest said workload value over a pre-established value indicating said other of said nodes as being overburdened and requiring job relief to said queue of the checking node.

7. The distributed heterogeneous computer system of claim 5 wherein:

said means at each node for dynamically and periodically calculating and saving a workload value as a function of the number of jobs on said node's queue comprises means for dividing the number of jobs on said node's queue by the service rate of said node.

8. The improvement to a distributed heterogeneous computer system of claim 5 wherein:

a) the jobs to be performed by said nodes are assigned priority levels; and, b) said polling of all the other nodes for their said workload value by a node is accomplished by said node as a job at the highest priority level.

9. In a distributed heterogeneous computer system having a plurality of computer nodes each operatively connected through a network interface to a network to provide for communications and transfers of data between the nodes and wherein the nodes each have a queue for containing jobs to be performed, the method of operation for dynamically reallocating the system's resources for optimized job performance comprising the steps of:

a) at each node, dynamically and periodically calculating and saving a workload value as a function of the number of jobs on the node's queue;

b) transfering the node's workload value to other nodes on the network at the request of the other nodes; and, c) at each node at the completion of each job,
c1) checking the node's own workload value,
c2) polling all the other nodes for their workload value if the checking node's workload value is below a pre-established value indicating the node as being underutilized and available to do more jobs,
c3) checking the workload values of the other nodes as received, and
c4) transfering a job from the queue of the other of the nodes having the highest the workload value over a pre-established value indicating the other of the nodes as being overburdened and requiring job relief to the queue of the checking node.

10. The method of operating a distributed heterogeneous computer system of claim 9 and when the node is idle additionally comprising the steps of:

checking the node's own workload value;

b) polling all the other nodes for their workload value if the checking node's the workload value is below a pre-established value indicating the node as being underutilized and available to do more jobs;

c) checking the workload values of the other nodes as received; and, d) transfering a job from the queue of the other of the nodes having the highest workload value over a pre-established value indicating the other of the nodes as being overburdened and requiring job relief to the queue of the checking node.

11. The method of operating a distributed heterogeneous computer system of claim 9 wherein said step of dynamically and periodically calculating and saving a workload value as a function of the number of jobs on the node's queue comprises the step of:

dividing the number of jobs on the node's queue by the service rate of the node.

12. The method of operating a distributed heterogeneous computer system of claim 9 wherein the jobs to be performed by the nodes are assigned priority levels and:

said step of polling of all the other nodes for their workload value by a node is accomplished by the node as a job at the highest priority level.

13. In a distributed heterogeneous computer system having a plurality of computer nodes each operatively connected through a network interface to a network to provide for communications and transfers of data between the nodes and wherein the nodes each have a queue for containing jobs to be performed, the improvement for dynamically reallocating the system's resources for optimized job performance comprising:

a) first logic means at each node for dynamically and periodically calculating and saving a workload value as a function of the number of jobs on the node's queue;

b) second logic means at each node for transfering the node's said workload value to other nodes on the network at the request of said other nodes; and, c) third logic means at each node operable at the completion of each job, said third logic means including,
c1) means for checking the node's own said workload value,
c2) means for polling all the other nodes for their said workload value if the checking node's said workload value is below a pre-established value indicating the node as being underutilized and available to do more jobs,
c3) means for checking the said workload values of the other nodes as received, and
c4) means for transfering a job from the queue of the other of the nodes having the highest said workload value over a pre-established value indicating said other of the nodes as being overburdened and requiring job relief to the queue of the checking node.

14. The improvement to a distributed heterogeneous computer system of claim 13 wherein:

said third logic means is also operable periodically when the node is idle.

15. The improvement to a distributed heterogeneous computer system of claim 13 wherein:

said first logic means at each node comprises means for dividing the number of jobs on the node's queue by the service rate of the node.

16. The improvement to a distributed heterogeneous computer system of claim 13 wherein the jobs to be performed by the nodes are assigned priority levels and wherein additionally:

said means for polling of all the other nodes for their said workload value by a node of said third logic means includes means for accomplishing said polling as a job at the highest priority level.

* * * * *